United States Patent
Wu et al.

(10) Patent No.: US 9,612,873 B2
(45) Date of Patent: Apr. 4, 2017

(54) DYNAMICALLY SCALABLE DATA COLLECTION AND ANALYSIS FOR TARGET DEVICE

(71) Applicant: MICROSOFT TECHNOLOGY LICENSING, LLC, Redmond, WA (US)

(72) Inventors: Yi-Lei Wu, Redmond, WA (US); Matthew Koscumb, Seattle, WA (US); Scott McMurray, Redmond, WA (US); Molly Grossman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/831,286

(22) Filed: Aug. 20, 2015

(65) Prior Publication Data

US 2017/0052821 A1    Feb. 23, 2017

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/50 | (2006.01) |

(52) U.S. Cl.
CPC .................. *G06F 9/5005* (2013.01)

(58) Field of Classification Search
None
See application file for complete search history.

(56) References Cited

U.S. PATENT DOCUMENTS

| | | |
|---|---|---|
| 7,290,048 B1 | 10/2007 | Barnett et al. |
| 8,601,155 B2 | 12/2013 | Toombs et al. |
| 8,838,801 B2 | 9/2014 | Alapati et al. |
| 2002/0152305 A1 | 10/2002 | Jackson et al. |
| 2006/0206698 A1 | 9/2006 | Foucher et al. |
| 2007/0076728 A1 | 4/2007 | Rieger et al. |
| 2009/0089325 A1 | 4/2009 | Bradford et al. |
| 2009/0182605 A1 | 7/2009 | Lappas et al. |
| 2012/0204267 A1 | 8/2012 | Prafullchandra et al. |

(Continued)

OTHER PUBLICATIONS

Rabinowitz, et al.,"Collecting and Analyzing Data", Published on: Oct. 20, 2013 Available at: http://ctb.ku.edu/en/table-of-contents/evaluate/evaluate-community-interventions/collect-analyze-data/main.

(Continued)

*Primary Examiner* — Craig Dorais
(74) *Attorney, Agent, or Firm* — Liang IP, PLLC

(57) ABSTRACT

A telemetry module integrated with an application may include a data collection and analysis engine configured to perform data collection and analysis for reporting to a service associated with the application. The telemetry module may include additional components configured to dynamically scale the data collection and analysis performed by the data collection and analysis engine for a target device such that parameters of the data collection and analysis correspond to resources and capabilities of the target device. For example, a scaling profile manager may receive a profile for a device on which the application is being executed from the service, where the profile defines criteria for the scaling of the data collection and analysis. The scaling profile manager may then determine one or more resources and capabilities of the device, compare the determined resources and capabilities to the criteria, and scale the data collection and analysis based on the comparison.

20 Claims, 6 Drawing Sheets

(56) References Cited

U.S. PATENT DOCUMENTS

| | | |
|---|---|---|
| 2012/0239739 A1 | 9/2012 | Manglik et al. |
| 2013/0238785 A1 | 9/2013 | Hawk et al. |
| 2014/0335491 A1 | 11/2014 | Behrmann et al. |
| 2015/0019234 A1 | 1/2015 | Cooper et al. |
| 2015/0046512 A1 | 2/2015 | Ashby et al. |
| 2015/0154170 A1 | 6/2015 | Ren |

OTHER PUBLICATIONS

"Collecting Telemetry Data from Your Apps", Published on: Oct. 10, 2013 Available at: http://msdn.microsoft.com/en-us/library/windows/apps/hh967787.aspx.

Iosup, Alexandru, "CAMEO: Continuous Analytics for Massively Multiplayer Online Games on Cloud Resources", In Proceedings of 15th International Euro-Par Conference, Aug. 25, 2009, 10 pages.

DYNAMICALLY SCALABLE DATA COLLECTION AND ANALYSIS FOR TARGET DEVICE

BACKGROUND

A data collection and analysis engine built into an application installed on a client device may be employed to collect, analyze, and report application data desired from the client device to a service provider associated with the application. However, data collection and analysis performed by a conventional data collection and analysis engine may be limited to parameters set by a developer. Often the parameters may accommodate for low-end devices that have limited hardware resources to ensure that the data collection and analysis performed by the data collection and analysis engine only takes a small footprint on the device, and does not cause software performance issues.

In some scenarios, it may be desirable for the data collection and analysis engine to collect and analyze data based on parameters corresponding to hardware resources available for a particular, target device on which the application is being executed. However, with the sheer number of device types employed today, the time and cost to develop and manage parameters for data collection and analysis such that the parameters correspond to the hardware resources for each device type would be excessive. Accordingly, conventional methods and engines for data collection and analysis could use improvements to enable dynamic variance of the parameters of the data collection and analysis such that the parameters may correspond to the hardware resources for any device type.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to dynamically scaling data collection and analysis for a target device. A profile for the device may be received from a service associated with an application being executed on the device, where the profile defines criteria for scaling of data collection and analysis performed by a data collection and analysis engine integrated with the application. One or more resources and capabilities of the device may be determined, the determined resources and capabilities of the device may be compared to the criteria, and the data collection and analysis may be scaled based on the comparison.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
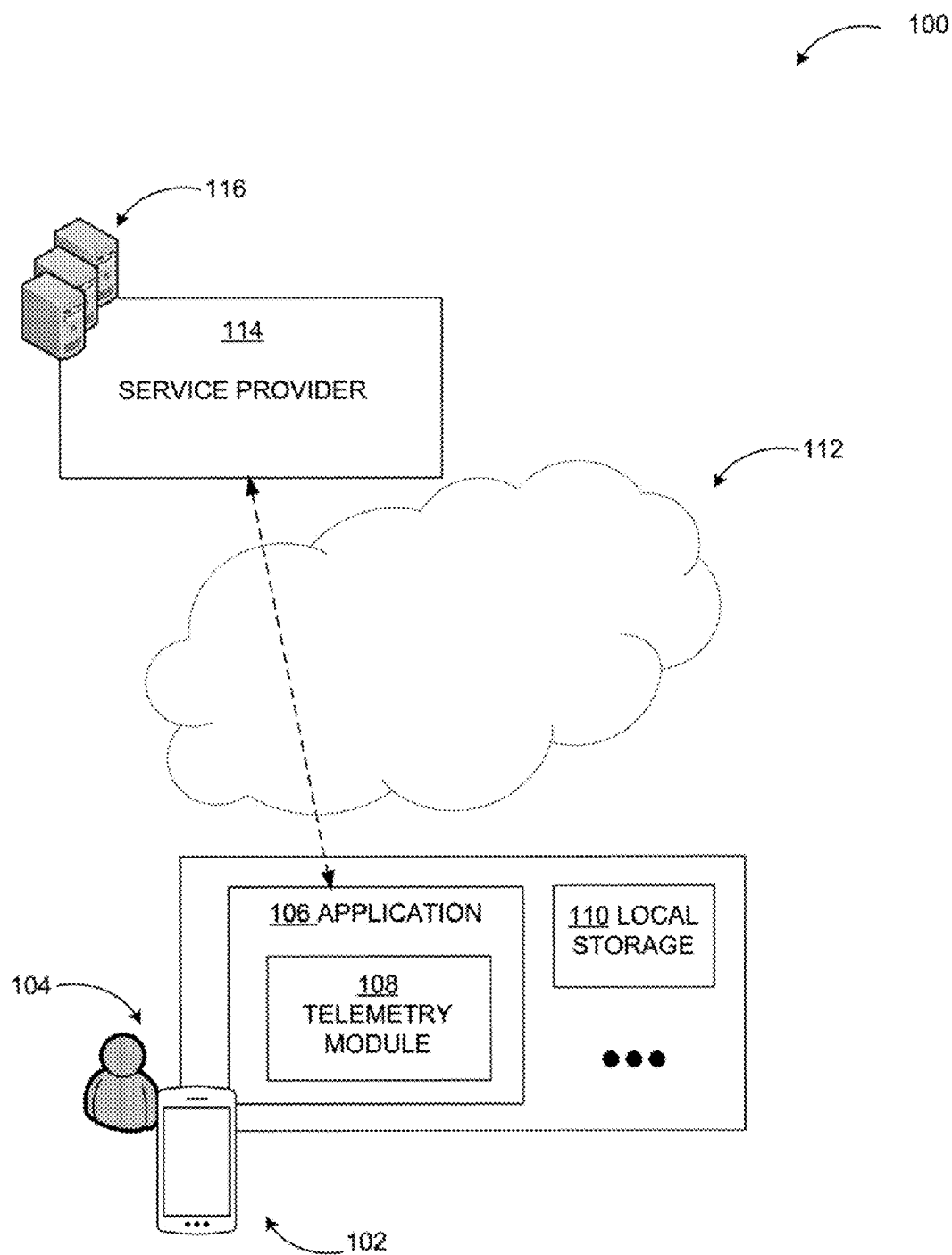
FIG. 1 includes an example network environment where a system to dynamically scale data collection and analysis for a target device may be implemented.

As briefly described above, a telemetry module integrated with an application may include a data collection and analysis engine configured to perform data collection and analysis for reporting to a service associated with the application. The telemetry module may also include various specialized components configured to dynamically scale data collection and analysis performed by the data collection and analysis engine for a target device. For example, a scaling profile manager may be configured to receive a profile for a device on which the application is being executed from the service associated with the application, where the profile may define criteria for the scaling of the data collection and analysis. The scaling profile manager may further be configured to determine one or more resources and capabilities of the device, compare the determined resources and capabilities to the criteria, and scale the data collection and analysis based on the comparison. In some embodiments, an optional resource monitor may determine the resources and capabilities of the device, and provide the determined resources and capabilities of the device to the scaling profile manager for the comparison. In further embodiments, the scaling profile manager may generate instructions for the scaling of the data collection and analysis, and one or more resource allocators associated with the data collection and analysis engine may receive and execute the instructions within the data collection and analysis engine.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device.

The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for dynamic scaling of data collection and analysis for a target device. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where a system to dynamically scale data collection and analysis for a target device may be implemented. As illustrated in diagram 100, a user 104 may execute a thick (e.g., a locally installed client application) version of an application 106 through a device 102. The device 102 may include a desktop computer, a laptop computer, a tablet computer, a vehicle mount computer, a smart phone, or a wearable computing device, among other similar devices. A service provider 114, such as a software provider, hosted by one or more servers 116 may be associated with the application 106 that is being executed on the device 102. The service provider 114 may desire to monitor and collect data associated with an activity, a performance, and/or a state of the application 106, as it is being executed on the device 102.

In some embodiments, the service provider 114 may monitor and collect data associated with a same application across multiple devices associated with many different users in order to detect, diagnose, and fix issues associated with the application 106. However, because the service provider 114 may be remote, it may be difficult to monitor, retrieve and store a large amount of raw application data from the multiple devices over the network 112. Additionally, exchanging large amounts of raw application data from the multiple devices over the network 112 may be inefficient, consuming valuable network and server resources. Furthermore, in order to address problems or issues associated with the application 106, the service provider 114 may need to deploy separate tools over the network 112 to the multiple devices executing the application 106. Direct access and manual interaction with the client device may also be required in order to detect, diagnose, and repair application issues, which can be inconvenient and inefficient as the service provider 114 may monitor a large number of applications distributed across many locations.

To overcome these inefficiencies, the service provider 114 may provide a telemetry module 108 in order to perform data retrieval and analysis of the application 106 as it is being executed at the device 102. The telemetry module 108 may be integrated with the application 106 such that the telemetry module 108 may not require separate installation and execution, but may be configured to continuously monitor data as the application 106 is executed, and provide the data to the service provider 114 remotely over a network 112, such as a cloud based network. For example, the telemetry module 108 may be configured to collect data requested by the service provider 114, analyze the data, and provide a data analysis report to the service provider 114 over the network 112. Content, such as the data collected by the telemetry module 108, may be stored locally at local storage 110 of the device 102 and/or remotely at data stores managed by the service provider 114, or by third party services. After receiving the data analysis report, the service provider 114 may efficiently implement processes to address issues with the application 106 detected in the data analysis report, such as providing a patch to fix an application problem over the network 112 to the application 106.

According to embodiments, the telemetry module 108 may include one or more components to facilitate data collection and analysis for reporting to the service provider 114. Example components may include a data collection and analysis engine that comprises a data collector and a rule manager and analyzer, and a telemetry transport component, where the components may be implemented as software, hardware, or combinations thereof. For example, the telemetry module 108 may receive instructions, which may be data collection rules, from the service provider 114 through the telemetry transport component. The data collection and analysis engine may collect and analyze data of the application 106 according to the data collection rules. The data analysis may then be provided to the service provider 114 over the network 112 through the telemetry transport component.

According to further embodiments, the telemetry module 108 may include one or more additional components configured to facilitate a dynamic scaling of the data collection and analysis performed by the data collection and analysis engine for a target device. The target device may be the device 102 on which the application 106 is being executed, for example. The additional components may include a scaling profile manager, and one or more dynamic resource allocators associated with the data collection and analysis engine, where the components may be implemented as software, hardware, or combinations thereof. For example, the scaling profile manager may be configured to receive a profile for the device 102 from the service provider 114. The profile may define criteria for a scaling of the data collection and analysis performed by the data collection and analysis engine. The scaling profile manager may be configured to determine one or more resources and capabilities of the device 102, and compare the resources and capabilities of the device 102 to the criteria. In some examples, an optional resource monitor of the telemetry module 108 may monitor the resources and capabilities of the device 102 in real-time, and provide the monitored resources and capabilities of the device to the scaling profile manager for the comparison.

The scaling profile manager may then be configured to scale the data collection and analysis based on the comparison. Scaling of the data collection and analysis may include allocating additional resources and capabilities of the device 102 to the data collection and analysis engine or de-allocating at least one of the resources and capabilities of the device 102 from the data collection and analysis engine. Scaling of the data collection and analysis may also include enabling or disabling features of the data collection and analysis engine, and/or adjusting one or more software limits of the data collection and analysis engine. In some examples, the scaling profile manager may be configured to generate instructions for the scaling of the data collection and analysis, and the resource allocators associated with the data collection and analysis engine may be configured to receive and execute the instructions within the data collection and analysis engine.

As discussed above, the data collection and analysis engine integrated with the application 106 may be employed to collect, analyze, and report application data from the device 102 to the service provider 114 associated with the application 106 over the network 112 such that the service provider 114 may detect, diagnose and fix problems with the application 106 based on the reported application data. Dynamic scaling of the data collection and analysis performed by the data collection and analysis engine, as described herein, may enable the data collection and analysis engine to collect and analyze the application data based on parameters corresponding to hardware resources that are available for a particular, target device on which the application is being executed, such as the device 102. As a result, the dynamic scaling of the data collection and analysis may enable optimized performance of the data collection and analysis without negatively impacting other operations executed by the target device by allocating/de-allocating resources to, enabling/disabling features of, and/or adjusting software limits of the data collection and analysis engine. The dynamic scaling of the data collection and analysis may enable reduced processor load (and consequently increased processing speed), conservation of memory, and reduced network bandwidth usage, among other features, that may improve the efficiency and performance of the target device. Furthermore, improved efficiency and performance of the target device may improve user efficiency and/or interaction with the target device.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of users and applications.

Figure 2:
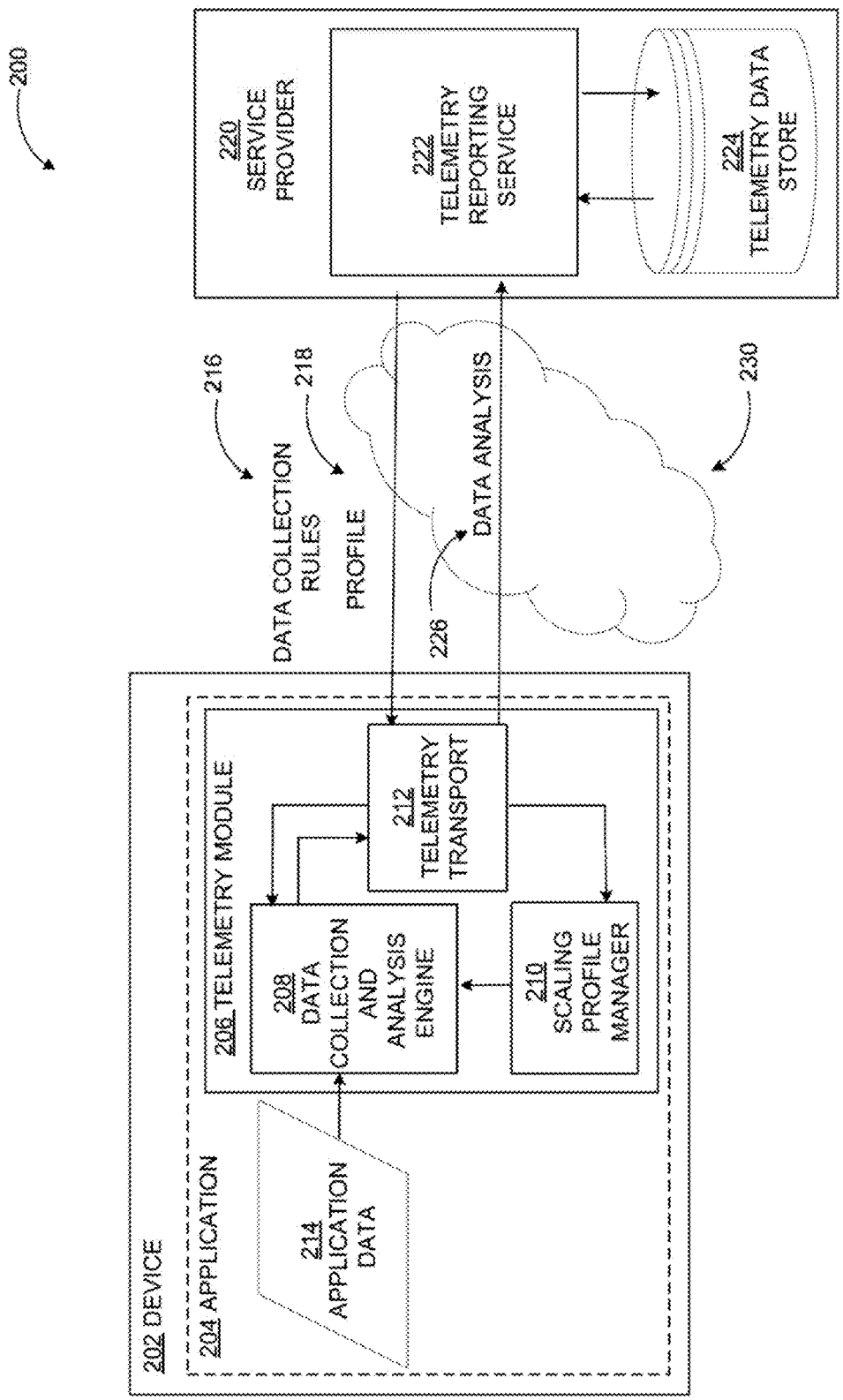
FIG. 2 includes a conceptual diagram illustrating a system to dynamically scale data collection and analysis for a target device.

FIG. 2 includes a conceptual diagram illustrating a system to dynamically scale data collection and analysis for a target device.

Diagram 200 illustrates a telemetry module 206 that may be integrated with an application 204 executed on a device 202. The telemetry module 206 may include a data collection and analysis engine 208 configured to perform data collection and analysis for reporting to a service provider 220 associated with the application 204, where the data collected and analyzed may include log data, event data, performance data, and state data associated with the application 204. The telemetry module 206 may also include a scaling profile manager 210 configured to dynamically scale the data collection and analysis performed by the data collection and analysis engine 208 for a target device, such as the device 202 on which the application 204 is being executed. The data collection and analysis may be scaled such that parameters of the data collection and analysis correspond to resources and capabilities of the target device, for example. The telemetry module 206 may further include a telemetry transport component 212 configured to communicate periodically with the service provider 220 over one or more networks, such as a cloud-based network 230.

In an example embodiment, the telemetry module 206 may receive data collection rules 216 from the service provider 220 through the telemetry transport component 212. The telemetry transport component 212 may provide the data collection rules 216 to the data collection and analysis engine 208. The data collection and analysis engine 208 may include two separate components, a data collector and a rule manager and analyzer. The data collector may filter through application data 214 to collect data requested in the data collection rules 216. The rule manager and analyzer may perform an analysis of the application data 214 according to the data collection rules 216. The telemetry module 108 may provide the data analysis 226 from the rule manager and analyzer to a telemetry reporting service 222 of the service provider 220 over the network 230 through the telemetry transport component 212. In some embodiments, the rule manager and analyzer may generate a report based on the data analysis 226 to be provided to the telemetry reporting service 222. The telemetry reporting service 222 may store the received data analysis 226 and/or report in an associated telemetry data store 224, where data analysis and/or reports from multiple distributed applications and devices may be stored and managed.

In some embodiments, the service provider 220 may monitor a same application as it is being executed on multiple different devices, and the telemetry reporting service 222 may receive data analysis and/or reports from multiple telemetry modules executed on the devices. For example, the service provider 220 may select a cluster of devices having a particular problem or issue, and may send the data collection rules 216 to the identified cluster of devices. In further embodiments, the telemetry module 206 may provide metadata associated with the device 202 to the service provider 220 to enable the service provider 220 to determine additional data collection rules and instructions to generate and provide based on particular metadata. For example, the service provider 220 may target a group of devices from which to collect data, such as collecting data from users executing a certain type of application, or running the application on a particular device, such as a tablet or smartphone, for example.

In further embodiments, the service provider 220 may define target features of devices for which a profile 218 is to be activated or deactivated, where the device 202 may comprise the defined target features enabling the profile 218 to be activated. The telemetry module 206 may receive the profile 218 from the service provider 220 through the telemetry transport component 212, and the telemetry transport component 212 may provide the profile 218 to the scaling profile manager 210. The profile 218 may define criteria for a scaling of data collection and analysis performed by the data collection and analysis engine 208. The criteria may include one or more triggers associated with resource events of the device 202, software events of the device 202, and/or user actions associated with the device 202. The resource events may include a computer processing unit (CPU) load percentage, an available memory, an available network, an available disk space, an available network bandwidth, and/or an available battery percentage, among other events. The software events may include crashes, errors, warnings, and/or updated data collection rule patterns, among other events. For example, the triggers may include less than a particular percentage of CPU load, greater than a particular percentage of available memory, and greater than a particular percentage of battery life associated with the device 202. The criteria may also include a response associated with the triggers. The response associated with the triggers may be to allocate or de-allocate an additional percentage of memory to the data collection and analysis engine 208, for example.

The scaling profile manager 210 may be configured to determine one or more resources and capabilities of the device 202. In some examples, the profile 218 may define a time and a frequency at which the scaling profile manager 210 determines the resources and capabilities of the device 202. The determined resources and capabilities of the device may include resources and capabilities associated with the triggers of the criteria, such as a CPU load percentage, an available memory, an available network, an available disk space, an available network bandwidth, and/or an available battery percentage. The scaling profile manager 210 may be configured to compare the resources and capabilities of the device 202 to the criteria. For example, the scaling profile manager 210 may determine whether the determined resources and capabilities of the device 202 correspond to the triggers of the criteria for the scaling of the data collection and analysis.

The scaling profile manager 210 may then be configured to scale the data collection and analysis based on the comparison. For example, in response to a determination that the determined resources and capabilities of the device correspond to the triggers, the data collection and analysis may be scaled based on the response associated with the triggers defined within the criteria. Scaling of the data collection and analysis based on the response may include allocating additional resources and capabilities of the device 202 to the data collection and analysis engine 208 or de-allocating at least one of the resources and capabilities of the device 202 from the data collection and analysis engine 208. Scaling of the data collection and analysis based on the response may also include enabling or disabling features of the data collection and analysis engine 208. For example, the features or capabilities of the data collection and analysis engine 208 may be enabled or disabled in response to the allocation or de-allocation of the resources of the device 202. Scaling of the data collection and analysis may further include adjusting one or more software limits of the data collection and analysis engine 208, where the software limits include a data grouping limit, an event queue size, a data upload size, an incoming rate of events, and/or battery usage incurred by the data collection and analysis engine 208.

In an example scenario, the device 202 executing the application 204 may be a smart phone that includes one core CPU and 512 megabytes (MB) of random-access memory (RAM). Initially, the data collection and analysis engine 208 of the telemetry module 206 may be allocated 10 MB of RAM for data collection and analysis in order to avoid performance impact. The profile 218 for the device 202 received from the service provider 220 may define criteria, including triggers and response(s) associated with the triggers, for scaling the data collection and analysis performed by the data collection and analysis engine 208. For example, the triggers of the criteria may include if the device 202 has less than a 20% CPU load, greater than a 60% available RAM, and greater than a 50% battery life. The response associated with the triggers may include to allocate an additional 10% of available memory to the data collection and analysis engine 208. The scaling profile manager 210 may determine the resources and capabilities of the device 202, compare the determined resources and capabilities of the device 202 to the criteria, and scale the data collection and analysis based on the comparison. For example, if the resources and capabilities of the device 202 correspond to the triggers of the criteria, the data collection and analysis engine 208 may be allocated the additional 10% of memory for data collection and analysis by the resource allocators associated with the data collection and analysis engine 208. Accordingly, the data collection and analysis engine 208 may be able to collect more data, process more events, and perform more complex analysis on the device 202. However, once the available resources and capabilities of the device 202 no longer correspond to the triggers of the criteria, the resource allocators may de-allocate the additional 10% of memory from the data collection and analysis engine 208.

Figure 3:
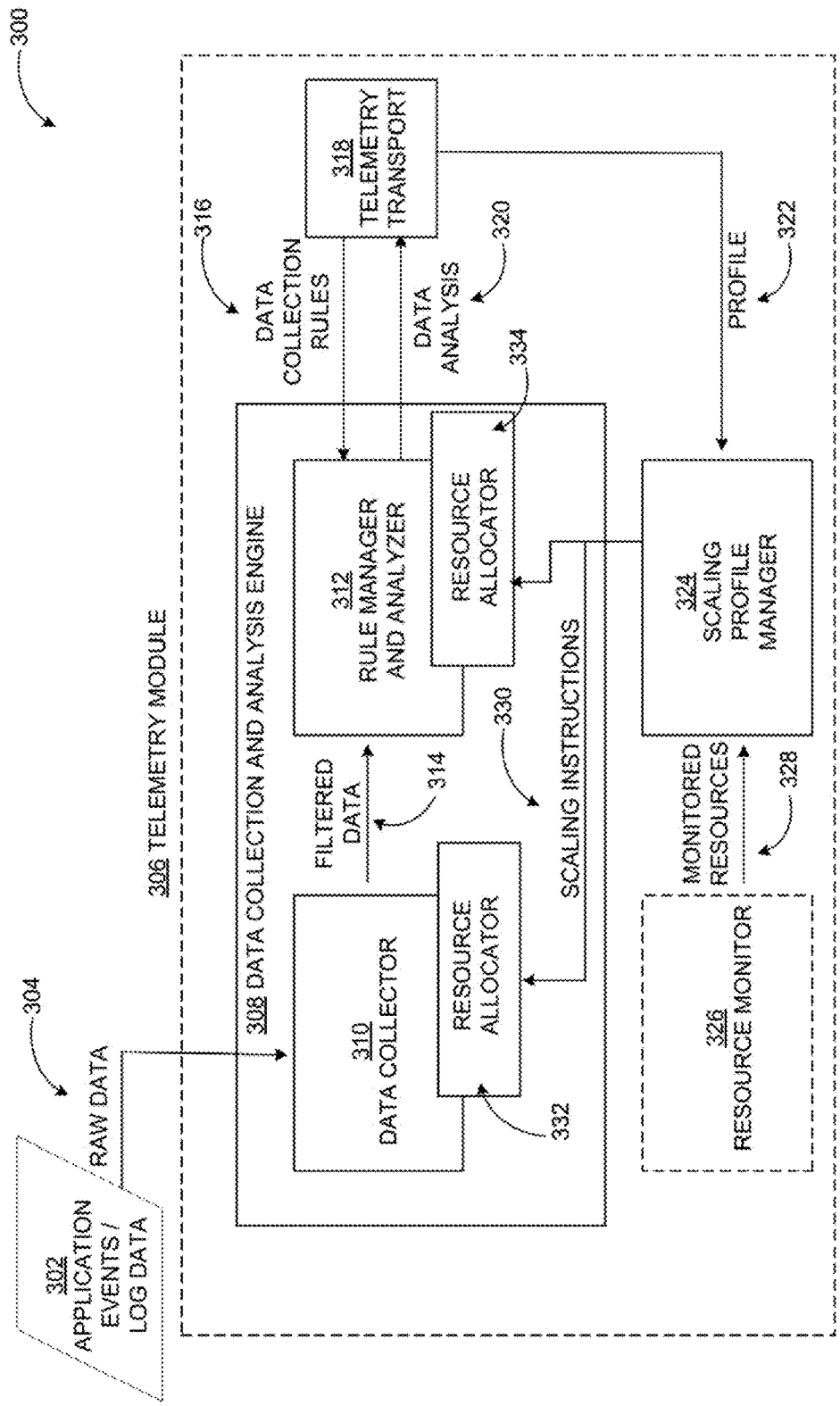
FIG. 3 illustrates an example configuration of a telemetry module.

FIG. 3 illustrates an example configuration of a telemetry module. As illustrated in diagram 300, a telemetry module 306 may comprise various components to facilitate dynamically scalable data collection and analysis. The telemetry module 306 may be integrated with an application installed on one or more devices, such that the telemetry module 306 may be configured to continuously collect and analyze data associated with the application as the application is being executed on the devices. The telemetry module 306 may provide and/or report the collected and analyzed data to a service provider associated with the application. Upon receipt of collected and analyzed data, the service provider may efficiently implement processes to address issues with the application detected in the collected and analyzed data.

In a system according to embodiments, the telemetry module 306 may include a data collection and analysis engine 308 configured to perform data collection and analysis for reporting to the service provider. The data collection and analysis engine 308 may include one or more separate components, such as a data collector 310 and a rule manager and analyzer 312, for example. The telemetry module 306 may also include a telemetry transport component 318 configured to communicate with the service provider. For example, the telemetry transport component 318 may receive a set of data collection rules 316 from the service provider, and provide the set of data collection rules 316 to the rule manager and analyzer 312 of the data collection and analysis engine 308. The set of data collection rules 316 may include instructions for what type of data to collect from the application, and what type of data analysis to perform. For example, the set of data collection rules 316 may identify an application installed on the device, and may instruct to collect particular operating information associated with the application.

The rule manager and analyzer 312 may be configured to process the set of data collection rules 316 to determine what data to collect and analyze from the application. For example, the rule manager and analyzer 312 may determine that particular data points associated with the application need to be collected, an average of the particular data points over a defined period of time needs to be calculated, and results of the calculations need to be reported back to the service provider. The rule manager and analyzer 312 may then communicate instructions defining what data should be collected and a set of operating conditions for when data should be collected to the data collector 310 of the data collection and analysis engine 308. In some examples, the rule manager and analyzer 312 may also enable a dynamic ability to change what data is collected based on a modified or different set of data collection rules received and/or a change in operating conditions of the device 202.

The data collector 310 may collect and pre-filter raw data 304, such as event and logging data 302, from the application based on the instructions communicated by the rule manager and analyzer 312. The rule manager and analyzer 312 may receive the pre-filtered data 314 from the data collector 310, and may apply logic to perform additional filtering and data analysis. The additional data analysis performed on the collected data by the rule manager and analyzer 312 may include performing calculations, summarizations, and logic on collected data, for example. The rule manager and analyzer 312 may provide the collected and analyzed data 320 to the telemetry transport component 318 for reporting to the service provider. In some embodiments, the rule manager and analyzer 312 may generate a report based on the collected and analyzed data 320 for provision to the service provider.

According to further embodiments, the telemetry module 306 may include a scaling profile manager 324 that may be configured to dynamically scale the data collection and analysis to be performed by the data collection and analysis engine 308. The scaling profile manager 324 may receive a profile 322 for a device on which the application is being executed from the telemetry transport component 318. The telemetry transport component 318 may receive the profile 322 from a service, such as a software provider, that is associated with the application. The software provider may define target features of a device for which the profile 322 is to be activated or deactivated, where the device may comprise the defined target features enabling the profile 322 to be activated. For example, the profile 322 may be activated on a device that has 2 gigabytes (GB) of RAM, and the device may include. The profile 322 may be defined as time-bound or event-bound such that the profile 322 may be activated or deactivated based on criteria defined within the profile 322. Specifically, the criteria defined within the profile 322 may include criteria for a scaling of data collection and analysis performed by the data collection and analysis engine 308.

The criteria may include one or more triggers, and a response associated with the triggers. The triggers may be associated with resource events of the device, software events of the device, and/or user actions associated with the device. The resource events may include a CPU load percentage, an available memory, an available network, an available disk space, an available network bandwidth, and/or an available battery percentage, for example. The software events may include crashes, errors, warnings, and/or updated data collection rule patterns, for example. The response may include allocating or de-allocating resources and/or capabilities of the device to the data collection and analysis engine 308. The response may also include enabling or disabling features of the data collection and analysis engine 308.

The scaling profile manager 324 may determine one or more resources and capabilities of the device. The profile 322 may further define a time and a frequency at which the scaling profile manager 324 should determine the resources and capabilities of the device. In other embodiments, a resource monitor 326 may monitor the resources and capabilities of the device in real-time, and provide the monitored resources and capabilities 328 of the device to the scaling profile manager 324. The determined resources and capabilities of the device may include resources and capabilities associated with the triggers of the criteria, such as a CPU load percentage, an available memory, an available network, an available disk space, an available network bandwidth, and/or an available battery percentage, for example.

The scaling profile manager 324 may be configured to compare the resources and capabilities of the device to the criteria. For example, the scaling profile manager 324 may determine whether the determined resources and capabilities of the device correspond to the triggers of the criteria for the scaling of the data collection and analysis. The scaling profile manager 324 may be configured to scale the data collection and analysis based on the comparison. For example, in response to a determination that the determined resources and capabilities of the device correspond to the triggers, the data collection and analysis may be scaled based on the response associated with the triggers. Scaling of the data collection and analysis based on the response may include allocating additional resources and capabilities of the device to the data collection and analysis engine 308 or de-allocating at least one of the resources and capabilities of the device from the data collection and analysis engine 308. Scaling of the data collection and analysis based on the response may also include enabling or disabling features of the data collection and analysis engine 308, where the features may be enabled or disabled in response to the allocation or de-allocation of the resources of the device. Scaling of the data collection and analysis based on the response may further include adjusting one or more software limits of the data collection and analysis engine, where the software limits include a data grouping limit, an event queue size, and/or a data upload site.

In some embodiments, the scaling profile manager 324 may be configured to generate instructions 330 for the scaling of the data collection and analysis, and provide the instructions 330 to one or more resource allocators associated with the data collection and analysis engine 308. For example, a first resource allocator 332 may be associated with the data collector 310 of the data collection and analysis engine 308, and a second resource allocator 334 may be associated with the rule manager and analyzer 312 of the data collection and analysis engine 308. Upon receipt, the first resource allocator 332 and the second resource allocator 334 may be configured to execute the instructions 330 within respective components of the data collection and analysis engine 308 to scale the data collection and analysis performed by the data collection and analysis engine 308.

The examples provided in FIGS. 1 through 3 are illustrated with specific services, devices, applications, modules, module components, and configurations. Embodiments are not limited to environments according to these examples. Dynamically scalable data collection and analysis for a target device may be implemented in environments employing fewer or additional services, devices, applications, modules, module components, and configurations. Furthermore, the example services, devices, applications, modules, module components, and configurations shown in FIG. 1 through 3 may be implemented in a similar manner with other values using the principles described herein.

Figure 4:
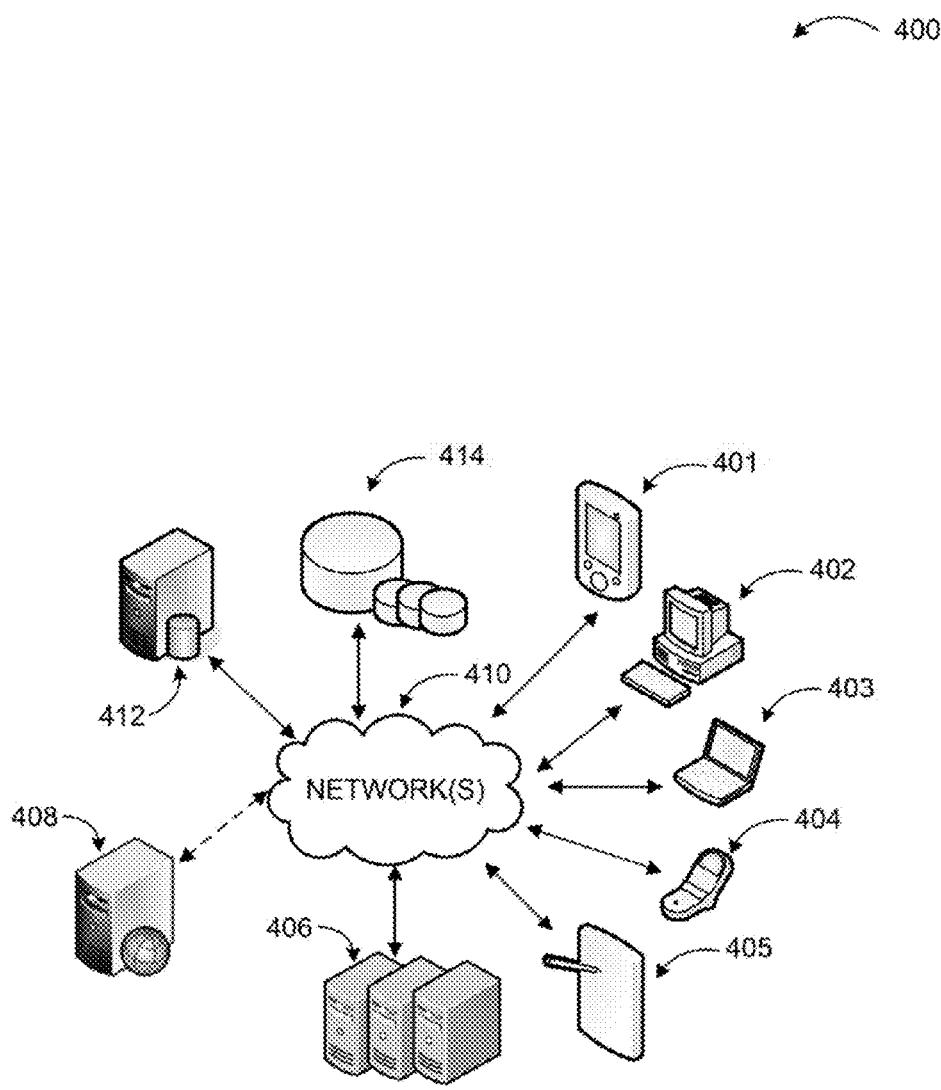
FIG. 4 is a networked environment, where a system according to embodiments may be implemented.

FIG. 4 is a networked environment, where a system according to embodiments may be implemented. In addition to locally installed applications, such as application 522 discussed below, a telemetry module may also be employed in conjunction with hosted applications and services that may be implemented via software executed over one or more servers 406 or individual server 408. A hosted service or application may communicate with client applications on individual computing devices such as a handheld computer 401, a desktop computer 402, a laptop computer 403, a smart phone 404, a tablet computer (or slate), 405 ('client devices') through network(s) 410 and control a user interface presented to users.

Client devices 401-405 are used to access the functionality provided by the hosted service or application. One or more of the servers 406 or server 408 may be used to provide a variety of services as discussed above. Relevant data may be stored in one or more data stores (e.g. data store 414), which may be managed by any one of the servers 406 or by database server 412.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to provide a telemetry engine for data collection and analysis. Furthermore, the networked environments discussed in FIG. 4 are for illustration purposes only. Embodiments are not limited to the example applications, modules, or processes.

Figure 5:
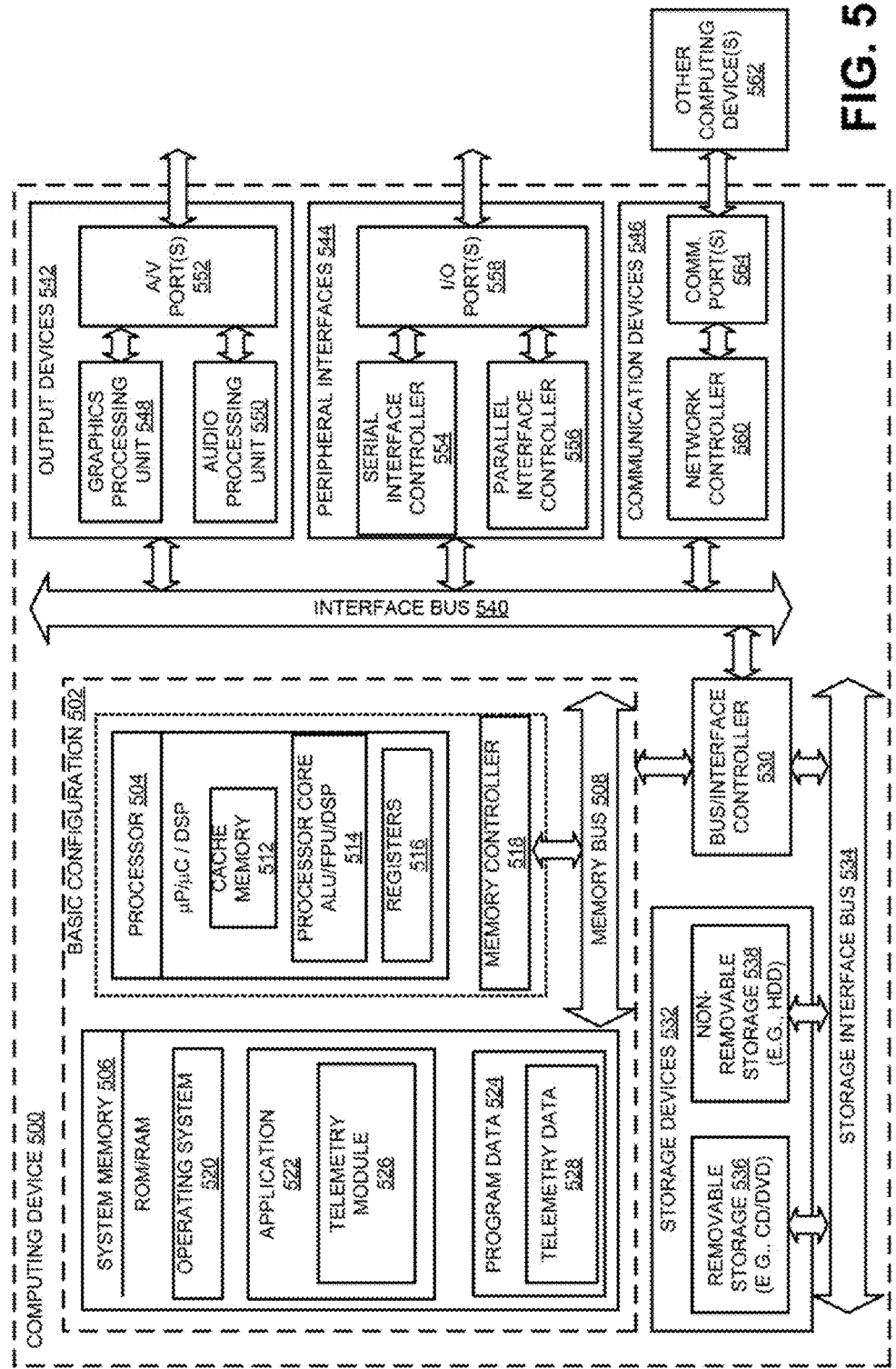
FIG. 5 is a block diagram of an example general purpose computing device, which may be used to dynamically scale data collection and analysis.

FIG. 5 and the associated discussion are intended to provide a brief, general description of a general purpose computing device, which may be used to dynamically scale data collection and analysis.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, an application 522, and program data 524. The application 522 may include a telemetry module 526, which may be an integrated module of the application 522. In addition to facilitating data collection and analysis for reporting to a service associated with the application 522, the telemetry module 526 may be configured to dynamically scale the data collection and analysis for the computing device 500, as described herein. The telemetry module 526 may include specialized components, such as a scaling profile manager, a data collection and analysis engine, one or more resource allocators associated with the data collection and analysis engine, a telemetry transport component, and an optional resource monitor, for example. The scaling profile manager may be configured to receive a profile for the computing device 500 from the service through the telemetry transport component, where the profile may define criteria for a scaling of data collection and analysis performed by the data collection and analysis engine. The scaling profile manager may further be configured to determine one or more resources and capabilities of the computing device 500, compare the determined resources and capabilities to the criteria, and scale the data collection and analysis based on the comparison. In some embodiments, the optional resource monitor may determine the resources and capabilities of the device, and provide the determined resources and capabilities of the device to the scaling profile manager for the comparison. In further embodiments, the scaling profile manager may generate instructions for the scaling of the data collection and analysis that are provided to the resource allocators for execution within the data collection and analysis engine. The program data 524 may include, among other data, telemetry data 528, as described herein. Telemetry data 528 may include the collected and analyzed data of the application 522, where the collected and analyzed data may be associated with an activity, a performance, and/or a state of the application 522, for example.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to dynamically scale data collection and analysis for a target device. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
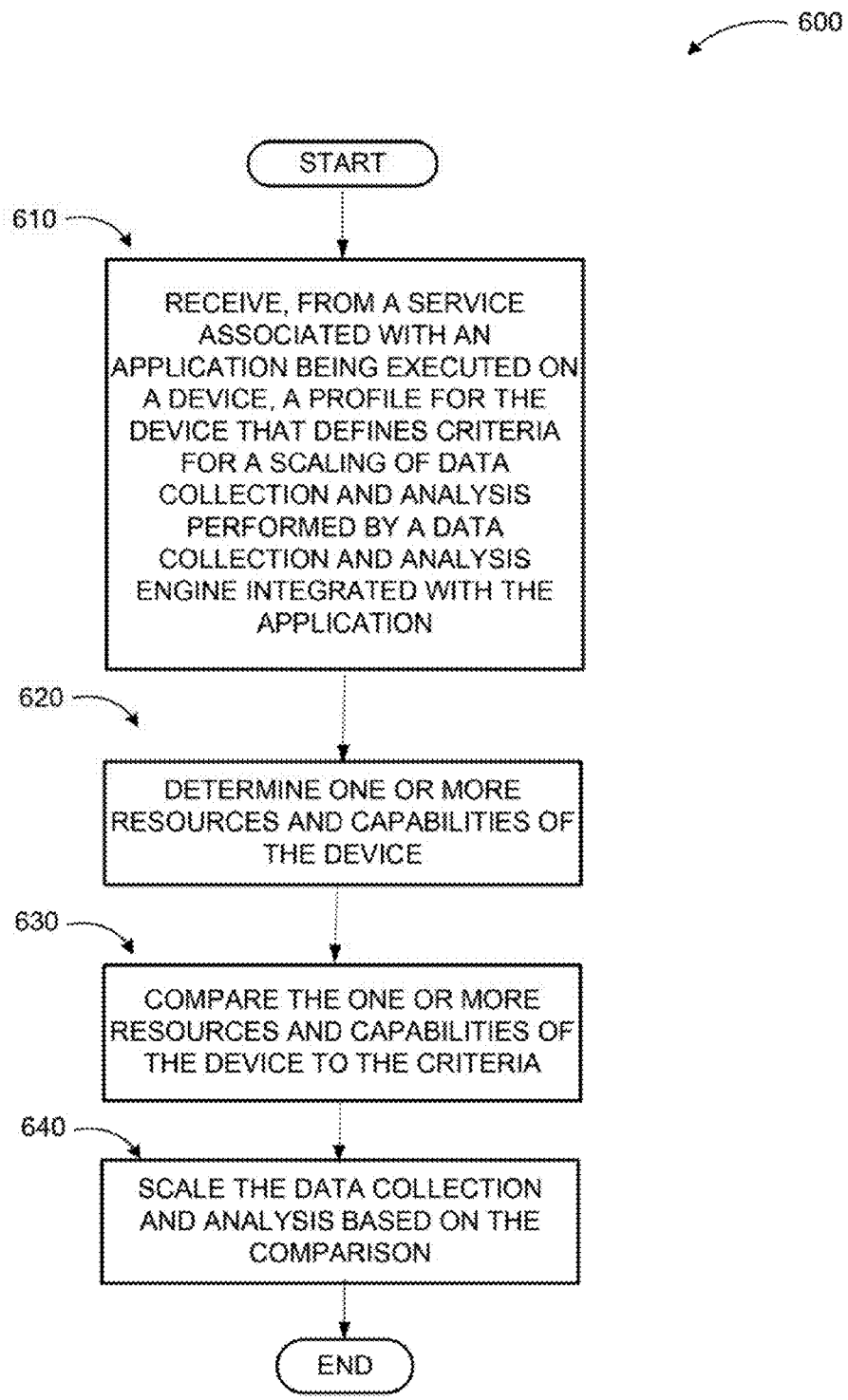
FIG. 6 illustrates a logic flow diagram of a method to dynamically scale data collection and analysis for a target device, according to embodiments.

FIG. 6 illustrates a logic flow diagram for process 600 of a method to dynamically scale data collection and analysis for a target device, according to embodiments. Process 600 may be implemented on a server or other system. An example system may include an application installed on a device, where a telemetry module is integrated with the application. The telemetry module may include specialized components, such as a scaling profile manager, a data collection and analysis engine, one or more resource allocators associated with the data collection and analysis engine, and an optional resource monitor.

Process 600 begins with operation 610, where the scaling profile manager may be configured to receive a profile for the device from a service that is associated with the application being executed on the device. The profile may define criteria for a scaling of data collection and analysis performed by the data collection and analysis engine. The criteria may include one or more triggers associated with resource events of the device, software events of the device, and/or user actions associated with the device. The criteria may also include a response for each of the triggers.

At operation 620, the scaling profile manager may be configured to determine one or more resources and capabilities of the device. In other embodiments, the resource monitor may monitor the resources and capabilities of the device in real-time, and provide the resources and capabilities of the device to the scaling profile manager. The determined resources and capabilities of the device may include resources and capabilities associated with the triggers of the criteria, such as a CPU load percentage, an available memory, an available network, an available disk space, an available network bandwidth, and/or an available battery percentage.

At operation 630, the scaling profile manager may be configured to compare the resources and capabilities of the device to the criteria. For example, the scaling profile manager may determine whether the determined resources and capabilities of the device correspond to the triggers of the criteria for the scaling of the data collection and analysis.

At operation 640, the scaling profile manager may be configured to scale the data collection and analysis based on the comparison. For example, in response to a determination that the determined resources and capabilities of the device correspond to the triggers, the data collection and analysis may be scaled based on the response associated with the triggers included within the criteria. Scaling of the data collection and analysis may include allocating additional resources and capabilities of the device to the data collection and analysis engine or de-allocating at least one of the resources and capabilities of the device from the data collection and analysis engine. Scaling of the data collection and analysis may also include enabling or disabling features of the data collection and analysis engine. Scaling of the data collection and analysis may further include adjusting one or more software limits of the data collection and analysis engine. In some embodiments, the scaling profile manager may be configured to generate instructions for the scaling of the data collection and analysis, and the resource allocators associated with the data collection and analysis engine may be configured to receive and execute the instructions within the data collections and analysis engine.

The operations included in process 600 are for illustration purposes. Dynamically scalable data collection and analysis may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, computing devices to dynamically scale data collection and analysis may be described. An example computing device may include a memory configured to store instructions, and one or more processors coupled to the memory, the one or more processors configured to execute, in conjunction with the instructions stored in the memory, an application and a telemetry module integrated with the application. The telemetry module may include a data collection and analysis engine configured to perform data collection and analysis for reporting to a service associated with the application, and a scaling profile manager configured to receive a profile from the service that defines criteria for a scaling of the data collection and analysis for the computing device. The scaling profile manager may be also configured to determine one or more resources and capabilities of the computing device, compare the resources and capabilities of the computing device to the criteria, and generate instructions for scaling the data collection and analysis based on the comparison, where the instructions include to allocate additional resources and capabilities of the device to the data collection and analysis engine, de-allocate at least one of the resources and capabilities of the device from the data collection and analysis engine, enable features of the data collection and analysis engine, and disable features of the data collection and analysis engine.

In other examples, the telemetry module may further include a resource allocator associated with the data collection and analysis engine configured to receive and execute the instructions generated by the scaling profile manager. The data collection and analysis engine may include a data collector component and a rule manager and analyzer component. The telemetry module may further include at least two resource allocators, where a first resource allocator is associated with the data collector component of the data collection and analysis engine and a second resource allocator is associated with the rule manager and analyzer component of the data collection and analysis engine. The telemetry module may further include a resource monitor configured to monitor the resources and capabilities of the computing device in real-time, where the resource monitor is configured to provide the resources and capabilities of the computing device to the scaling profile manager for the comparison.

In further examples, the criteria for the scaling of the data collection and analysis may include one or more triggers and a response associated with the triggers, and the triggers may be associated with resource events of the computing device, software events of the computing device, and/or user actions associated with the computing device. The resource events of the computing device may include a CPU load percentage, an available memory, an available network, an available disk space, an available network bandwidth, and/or an available battery percentage. The software events of the computing device may include crashes, errors, warnings, and/or updated data collection rule patterns. The service may define the profile time-bound or event-bound. The service may also define a target device on which the profile is to be activated, and the computing device may correspond to the target device defined. The resources and capabilities of the computing device determined may include a computer processing unit (CPU) load percentage, an available memory, an available network, an available disk space, an available network bandwidth, and/or an available battery percentage.

According to some embodiments, methods executed on a computing device to dynamically scale data collection and analysis may be provided. An example method may include receiving, from a service associated with an application being executed on the computing device, a profile for the computing device that defines criteria for scaling of data collection and analysis performed by a data collection and analysis engine. The example method may also include determining one or more resources and capabilities of the computing device, comparing the resources and capabilities of the computing device to the criteria, and scaling the data collection and analysis based on the comparison.

In other embodiments, scaling the data collection and analysis based on the comparison may include allocating additional resources and capabilities of the computing device to the data collection and analysis engine, de-allocating at least one of the resources and capabilities of the computing device from the data collection and analysis engine, enabling features of the data collection and analysis engine, and/or disabling features of the data collection and analysis engine. Scaling the data collection and analysis based on the comparison may also include adjusting one or more software limits of the data collection and analysis engine, where the software limits include a data grouping limit, an event queue size, and/or a data upload size.

In further embodiments, comparing the resources and capabilities of the computing device to the criteria may include determining whether the resources and capabilities of the computing device correspond to one or more triggers included within the criteria for the scaling of the data collection and analysis. Scaling the data collection and analysis based on the comparison may include scaling the data collection and analysis based on a response for the triggers included within the criteria for the scaling of the data collection and analysis in response to a determination that the resources and capabilities of the computing device correspond to the triggers.

According to some examples, computer readable memory devices with instructions stored thereon to dynamically scale data collection and analysis may be described. Example instructions may include receiving, from a service associated with an application being executed on the device, a profile for the device that defines criteria for scaling of data collection and analysis performed by a data collection and analysis engine. The example instructions may also include determining resources and capabilities of the device and comparing the resources and capabilities of the device to the criteria. The example instructions may further include scaling the data collection and analysis based on the comparison by allocating additional resources and capabilities of the device to the data collection and analysis engine, de-allocating at least one of the resources and capabilities of the device from the data collection and analysis engine, enabling features of the data collection and analysis engine, and/or disabling features of the data collection and analysis engine.

In other examples, the profile further defines a time and a frequency at which the resources and capabilities of the device are determined. The profile may be received from a server executing the service through a telemetry transport component.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to dynamically scale data collection and analysis, the computing device comprising:
   a memory configured to store instructions; and
   one or more processors coupled to the memory, the one or more processors configured to execute, in conjunction with the instructions stored in the memory, an application, wherein the memory contains instructions executable by the one or more processor to perform a process comprising:

performing data collection and analysis associated with the executed application for reporting to a service associated with the application via a computer network; and dynamically scaling the performed data collection and analysis, including:
receiving a profile from the service, wherein the received profile defines criteria for scaling the performed data collection and analysis for the computing device;
determining one or more resources and capabilities of the computing device;
comparing the one or more resources and capabilities of the computing device to the criteria; and
generating instructions for scaling the data collection and analysis based on the comparison, wherein the instructions include to one or more of: allocating additional resources and capabilities of the computing device to the performed data collection and analysis, de-allocating at least one of the one or more resources and capabilities of the computing device from the performed data collection and analysis, enabling features of performing the data collection and analysis, or disabling other features of performing the data collection and analysis.

2. The computing device of claim 1, wherein the process performed by the one or more processor further comprises receiving and executing the instructions generated for scaling the data collection and analysis.

3. The computing device of claim 1, wherein the performed data collection and analysis comprises collecting data related to execution of the application on the computing device and analyzing the collected data related to the execution of the application on the computing device.

4. The computing device of claim 3, wherein dynamically scaling the performed data collection and analysis includes separately allocating the one or more resources and capabilities of the computing device to collecting the data related to execution of the application on the computing device and analyzing the collected data related to the execution of the application on the computing device.

5. The computing device of claim 1, wherein the process performed by the one or more processor further comprises:
monitoring the one or more resources and capabilities of the computing device in real-time.

6. The computing device of claim 5, where the process performed by the one or more processor further comprises providing the monitored one or more resources and capabilities of the computing device for the comparison between the one or more resources and capabilities of the computing device and the criteria.

7. The computing device of claim 1, wherein the criteria for the scaling of the data collection and analysis includes one or more triggers and a response associated with the one or more triggers, and wherein the one or more triggers are associated with one or more of resource events of the computing device, software events of the computing device, user actions associated with the computing device.

8. The computing device of claim 7, wherein the resource events of the computing device include one or more of a CPU load percentage, an available memory, an available network, an available disk space, an available network bandwidth, or an available battery percentage.

9. The computing device of claim 7, wherein the software events of the computing device include one or more of crashes, errors, warnings, updated data collection rule patterns.

10. The computing device of claim 1, wherein the received profile is defined by the service as one of time-bound or event-bound.

11. The computing device of claim 1, wherein the received profile defines a target device on which the dynamically scaling is to be activated, and wherein the computing device corresponds to the target device defined in the profile.

12. The computing device of claim 1, wherein the one or more resources and capabilities of the computing device determined include one or more of a computer processing unit ("CPU") load percentage, an available memory, an available network, an available disk space, an available network bandwidth, or an available battery percentage.

13. A computer readable memory device with instructions stored thereon to dynamically scale data collection and analysis, the instructions comprising:
receiving, from a service associated with an application being executed on the device, a profile for the device that defines criteria for scaling of data collection and analysis performed by a data collection and analysis engine;
determining one or more resources and capabilities of the device;
comparing the one or more resources and capabilities of the device to the criteria; and
scaling the data collection and analysis based on the comparison by one or more of: allocating additional resources and capabilities of the device to the data collection and analysis engine, de-allocating at least one of the one or more resources and capabilities of the device from the data collection and analysis engine, enabling features of the data collection and analysis engine, and disabling features of the data collection and analysis engine.

14. The computer readable memory device of claim 13, wherein the profile further defines a time and a frequency at which the one or more resources and capabilities of the device are determined.

15. The computer readable memory device of claim 13, wherein the profile is received from a server executing the service through a telemetry transport component.

16. A method performed by a computing device to dynamically scale data collection and analysis associated with an application executing on the computing device, the method comprising:
performing data collection and analysis associated with the application executed on the computing device for reporting to a service associated with the application via a computer network; and
dynamically scaling the performed data collection and analysis, including:
receiving a profile from the service, wherein the received profile defines one or more criteria for scaling the performed data collection and analysis for the computing device;
determining one or more resources and capabilities of the computing device;
comparing the one or more resources and capabilities of the computing device to the received one or more criteria; and
generating instructions for scaling the data collection and analysis performed on the computing device based on the comparison, wherein the instructions include to one or more of:
allocating additional resources and capabilities of the computing device to the performed data collection and analysis;

de-allocating at least one of the one or more resources and capabilities of the computing device from the performed data collection and analysis;
enabling features of performing the data collection and analysis; or
disabling other features of performing the data collection and analysis.

17. The method of claim 16, further comprising receiving and executing the instructions generated for scaling the data collection and analysis.

18. The method of claim 16, wherein the performed data collection and analysis comprises collecting data related to execution of the application on the computing device and analyzing the collected data related to the execution of the application on the computing device.

19. The method of claim 18, wherein dynamically scaling the performed data collection and analysis includes separately allocating the one or more resources and capabilities of the computing device to collecting the data related to the execution of the application on the computing device and analyzing the collected data related to the execution of the application on the computing device.

20. The method of claim 16, further comprising:
monitoring the one or more resources and capabilities of the computing device in real-time; and
providing the monitored one or more resources and capabilities of the computing device for the comparison between the one or more resources and capabilities of the computing device and the received one or more criteria.

* * * * *